United States Patent [19]

Janc et al.

[11] 4,377,866

[45] Mar. 22, 1983

[54] TIME MULTIPLEXED LORAN SIGNAL PROCESSING APPARATUS

[75] Inventors: Robert V. Janc, Palos Heights; David S. Robins, Buffalo Grove; Michael H. Retzer, Schaumburg, all of Ill.

[73] Assignee: Motorola, Inc., Schaumburg, Ill.

[21] Appl. No.: 222,458

[22] Filed: Jan. 5, 1981

[51] Int. Cl.³ .............................................. G01S 1/24
[52] U.S. Cl. ..................... 375/94; 343/103; 364/452
[58] Field of Search .................... 375/96, 99, 94; 343/103, 112 R; 370/42, 44, 47, 48, 50–53, 58, 68, 112; 364/178, 452; 328/17, 18, 83, 151

[56] References Cited

U.S. PATENT DOCUMENTS

| | | | |
|---|---|---|---|
| 3,488,435 | 1/1970 | Eilenberger | 370/112 |
| 3,750,178 | 7/1973 | Hulst | 343/112 R |
| 3,872,389 | 3/1975 | Willard | 328/137 |
| 3,934,254 | 1/1976 | Vogeler et al. | 343/103 |
| 4,104,635 | 8/1978 | Brodeur | 343/103 |
| 4,146,750 | 3/1979 | Spiesman | 370/112 |
| 4,150,380 | 4/1979 | Brodeur | 343/103 |

*Primary Examiner*—Benedict V. Safourek
*Assistant Examiner*—Stephen Chin
*Attorney, Agent, or Firm*—Mark P. Kahler; Edward M. Roney; James W. Gillman

[57] ABSTRACT

Loran C signal processing apparatus is provided which employs a single signal channel or path to process and sample Loran C RF signals and envelope derived Loran C RF signals which in conventional approaches are processed and sampled in separate signal paths.

6 Claims, 12 Drawing Figures

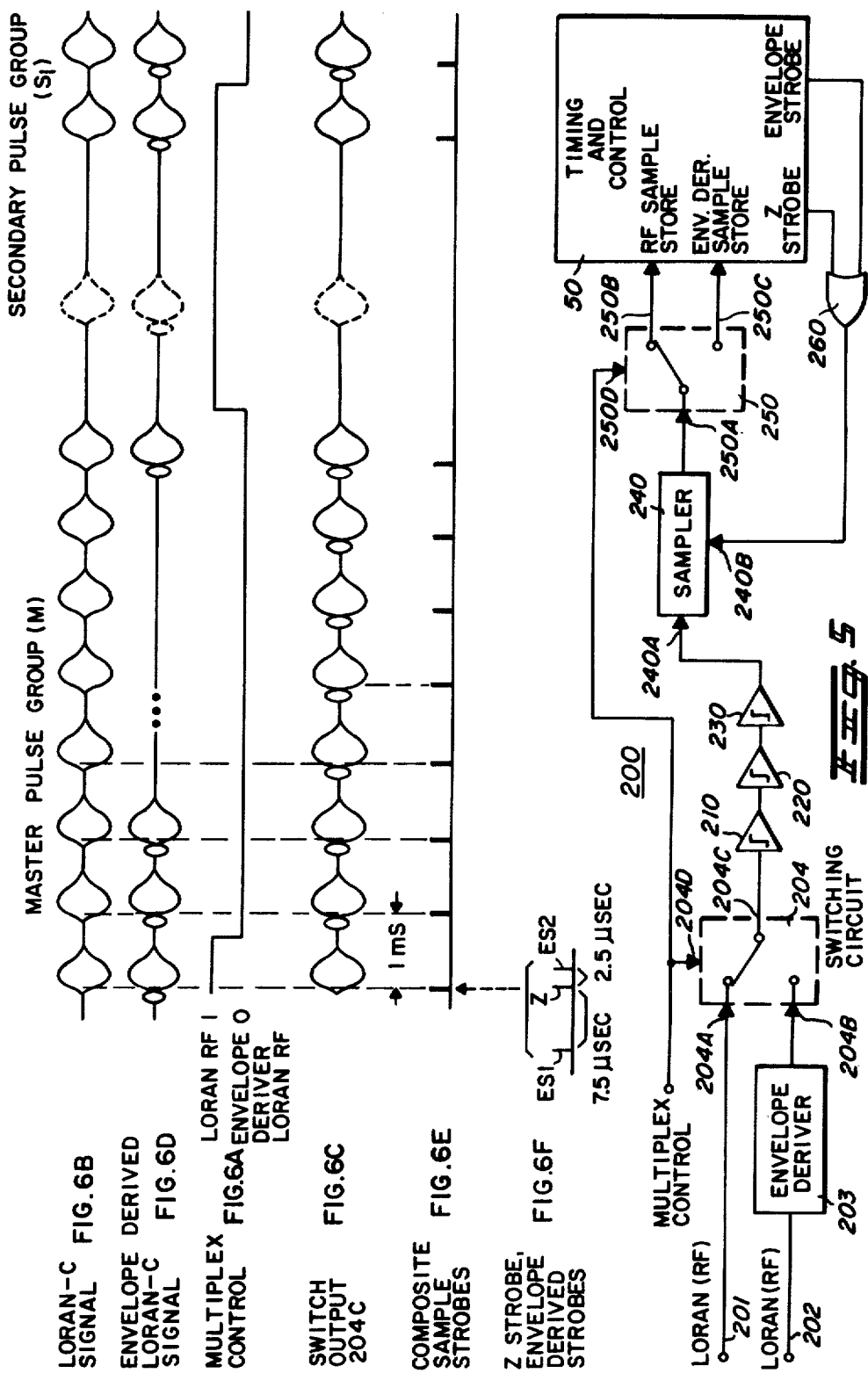

TIME MULTIPLEXED LORAN SIGNAL PROCESSING APPARATUS

BACKGROUND OF THE INVENTION

This invention relates generally to apparatus for processing Loran signals, and more particularly to apparatus for processing a received Loran C signal and the corresponding envelope derived Loran C signal generated therefrom.

DESCRIPTION OF THE PRIOR ART

One system often employed for radio navigation purposes is the Loran C system. A typical Loran C chain of transmitting stations includes a master station and first and second secondary stations each of which transmits a plurality of radio frequency pulses at preselected times relative to each other. As shown in FIG. 1, the master and first and second secondary stations each transmit a pulse group during a period of time designated the group repetition interval (GRI). More specifically, the master station first transmits a sequence of eight radio frequency pulses designated M, such pulses being generated at one millisecond intervals and being followed by a ninth pulse often employed for manual identification of the master station signal. The first secondary station generates a pulse group of eight radio frequency pulses designated $S_1$ a predetermined amount of time after pulse group transmission by the master station. A second secondary station transmits yet another pulse group of eight radio frequency pulses designated $S_2$ a predetermined amount of time after transmission of the $S_1$ pulse group. The times at which the master and first and second secondary station pulse groups are transmitted in each GRI are selected such that the times at which the pulse groups are received at a Loran C receiver do not overlap in time. This sequence of pulse group transmission, first by the master station followed by the first and second secondary stations, continues ad infinitum over successive GRI's. To determine the location of a Loran C receiving station, the time difference (TD) between the time of arrival of the first secondary station pulse groups and the master station pulse groups is determined and employed to plot a hyperbolic line of position on an appropriate map. The time difference between the time of arrival of the second secondary station pulse groups and the master station pulse groups at the Loran C receiver is determined and used to plot a second hyperbolic line of position intersecting with the above first mentioned line of position thus yielding the location of the Loran C receiver.

Each one of the vertical lines shown in FIG. 1 represents a Loran C pulse. More clearly, an expanded version of such a Loran C pulse is shown in FIG. 2A. The third positive going zero crossing of such a Loran C pulse is designated the pulse tracking reference (PTR). Loran C receivers customarily track the PTR's of the incoming received Loran C signals from the master and secondary stations to accurately determine the time differences between signals from such stations. Conventional apparatus for tracking the selected zero crossings of incoming received Loran C signals and for determining the zero crossing corresponding to the PTR is shown in FIG. 4. Basically, the apparatus of FIG. 4 includes first and second channels or signal paths designated by inputs 1 and 2 in FIG. 4. The first channel locates a particular zero crossing in successive pulses of a particular station's pulse group over several GRI's. The second channel determines whether the particular zero crossing selected by the first channel is the PTR. To track the incoming Loran C pulses provided at input 1, the first channel includes a plurality of hard limiting amplifiers, for example, three amplifiers designated 10, 20 and 30, respectively, connected in series as shown. The hard limited Loran C pulses generated by such amplifiers are fed to an input 40A of a sampling circuit 40. Sampling circuit 40 includes an input 40B for receiving strobe signals to instruct sampling circuit 40 when to sample the Loran C signals provided to sampling circuit input 40A. The samples of the Loran C signal taken by sampling circuit 40 are generated at output 40C and are provided to an appropriate memory designated RF SAMPLE STORE within a Loran C timing and control circuit 50. Control circuit 50 is of the conventional type which generates a signal at the Z STROBE output thereof. Such a Z STROBE signal is comprised of sampling strobes which are fed to sampling circuit input 40B to instruct sampling circuit 40 to sample the Loran C signals of the first channel at a selected zero crossing referred to as Z. Timing and control circuit 50 includes in general any apparatus employed in Loran C receivers for controlling tracking of Loran C pulse zero crossings and PTR's.

The second channel included in conventional Loran C pulse tracking apparatus is the envelope deriver channel. Such a second channel includes an input 2 to which the received Loran C pulses are provided. Input 2 is coupled to an envelope deriver circuit which processes the Loran C pulses shown in FIG. 2A so as to cause a phase reversal at the PTR's of such pulses as shown in the envelope derived Loran C pulse shown in FIG. 2B. This phase reversal is generated at the PTR's of the second channel Loran C pulses to make the PTR zero crossing stand out from all the other zero crossings of the Loran C pulses. A box is drawn around the portion of the Loran C pulse of FIG. 2B in the region at which the phase reversal is injected by envelope deriver 60. FIG. 3 shows a close up view of the phase reversal portion of the envelope derived Loran C pulse. The output of envelope deriver circuit 60 is coupled to a plurality of hard limiting amplifiers 110, 120, and 130, respectively, connected in series as shown in FIG. 4. Amplifiers 110 through 130 hard limit the envelope derived signal of the second channel and provide such signal to an input 140A of a sampling circuit 140. Sampling circuit 140 samples the envelope derived signal of the second channel at times determined by a strobe signal provided to input 140B thereof. Input 140B is coupled to an ENVELOPE STROBE output of timing and control circuit 50 to provide sampling circuit input 140B with an envelope strobe signal comprised of at least one strobe generated by control circuit 50 prior to each Z strobe and at least one envelope strobe after each Z strobe. These envelope strobes prior to and after each Z strobe are received in the proper time relation with respect to the Z strobes such that if a phase inversion occurs in the envelope channel at the particular Loran pulse zero crossing corresponding to the Z strobe, the envelope strobe immediately prior to such Z strobe results in a positive polarity sample of the envelope derived signal being taken by sampling circuit 140, whereas the envelope strobe immediately after the Z strobe results in a negative polarity sample of the envelope derived Loran signal. Such samples are generated at sampling circuit output 140C and are stored in appropriate memory apparatus in timing and control circuit 50 via a signal path provided between output 140C and an envelope derived sample storage input of circuit 50 designated ENV DER SAMPLE STROBE. When timing and control circuit 50 determines that a phase reversal has occurred in the envelope derived Loran signal of the second channel at a Loran pulse zero crossing selected by the first channel, then the PTR is deemed located.

For the PTR detection apparatus of FIG. 4 to properly function, the time delay of the Loran signal through amplifiers 10 through 30 of the first channel must be very nearly equal to the time delay of the envelope derived Loran signal through amplifiers 110 through 130 of the second channel. To accomplish this, amplifiers which are precisely matched must be employed for amplifiers 10 through 30 and 110 through 130. Such amplifiers tend to be rather expensive.

One object of the present invention is to eliminate the time delay amplifier matching difficulties referred to above.

Another object of the present invention is to provide pulse tracking reference detection apparatus having a minimal number of components and thus reduced cost.

These and other objects of the invention will become apparent to those skilled in the art upon consideration of the following description of the invention.

BRIEF SUMMARY OF THE INVENTION

The present invention is directed to providing an apparatus for identifying a pulse tracking reference (PTR) of received Loran C signals.

In accordance with one embodiment of the present invention, a Loran signal processing device includes a first switching circuit for selectively switching a Loran signal and an envelope derived Loran signal to a first output. A sampling circuit is coupled to the first output for sampling signals provided thereto to generate Loran samples and envelope derived Loran samples. A second switching circuit is coupled to the sampling circuit for selectively switching the Loran signal samples to a second output and the envelope derived Loran samples to a third output.

The features of the invention believed to be novel are set forth with particularity in the appended claims. The invention itself, however, both as to organization and method of operation, together with further objects and advantages thereof, may best be undertaken by reference to the following description taken in conjunction with the accompanying drawings.

DESCRIPTION OF THE DRAWINGS

FIG. 5 is a Loran signal processing device in accordance with the present invention.

FIG. 6A is a multiplex control signal.

FIG. 6B shows a typical Loran C master pulse group followed by a part of a secondary pulse group.

FIG. 6C is the output signal of switching circuit 204.

FIG. 6D is an envelope derived version of the pulses of FIG. 6A.

FIG. 6E is a composite strobe signal.

FIG. 6F is a graph showing the time relationship of the Z strobe and the envelope derived strobes ES1 and ES2.

DETAILED DESCRIPTION OF THE PREFERRED EMBODIMENT

Figure 1:
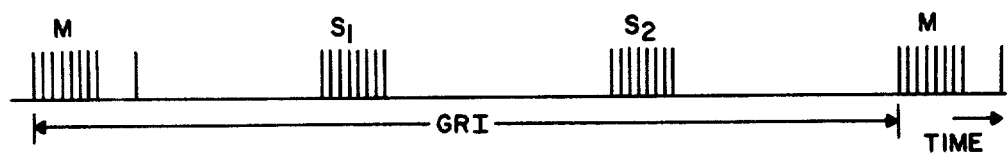
FIG. 1 shows typical pulse groups of master, first secondary and second secondary Loran C transmitting stations.
Figure 2A:
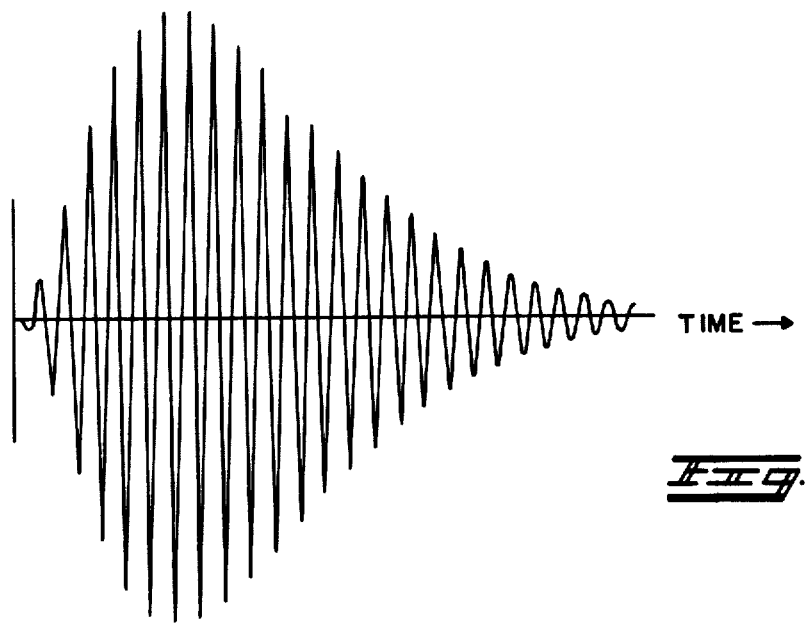
FIG. 2A shows a typical Loran C pulse.
Figure 2B:
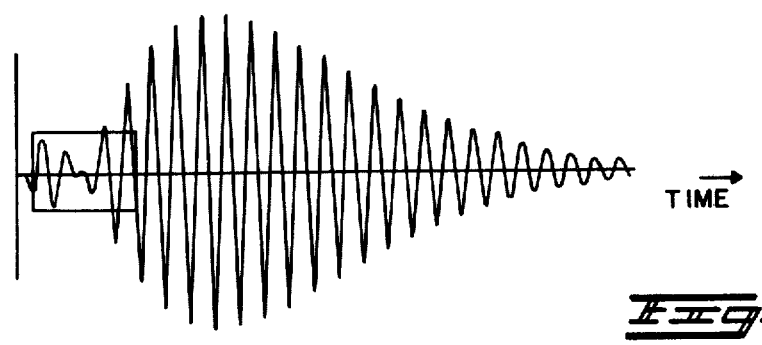
FIG. 2B shows an envelope derived Loran C signal pulse.
Figure 3:
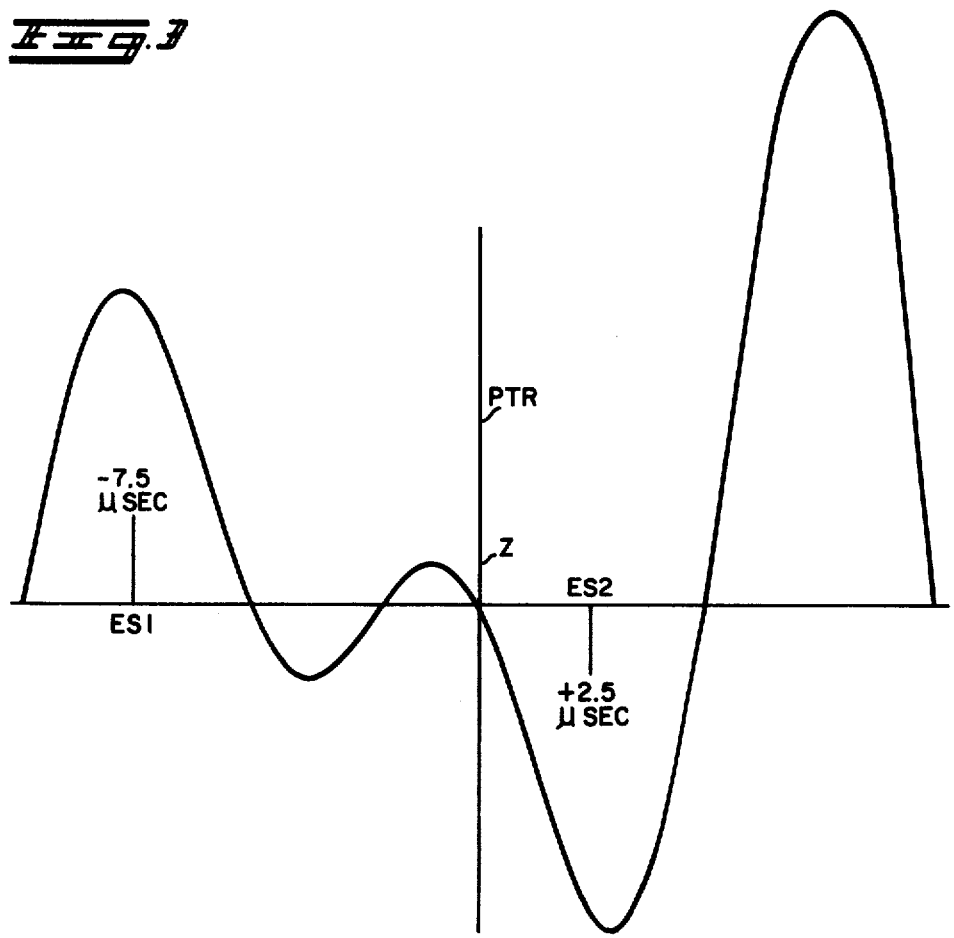
FIG. 3 is a close up view of the phase reversal portion of an envelope derived Loran C pulse.
Figure 4:
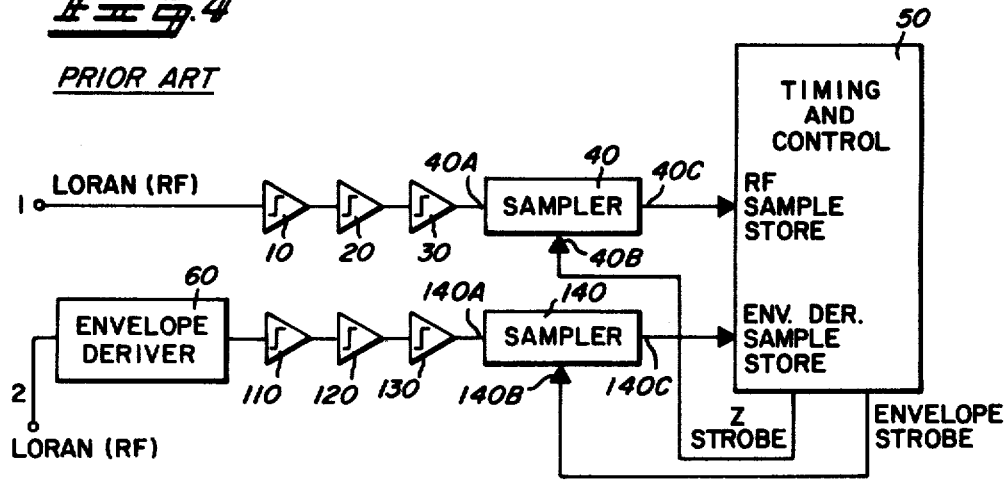
FIG. 4 is a block diagram of a conventional two channel PTR identification apparatus.

FIG. 5 shows a Loran signal processing apparatus 200 in accordance with the present invention. Processing apparatus 200 includes inputs 201 and 202 to which a received Loran C radio frequency signal is fed. Input 202 is coupled to the input of an envelope deriver circuit 203 which generates envelope derived Loran C signals at the output thereof. Envelope deriver circuits are well known to those skilled in the art. As already discussed, such envelope deriver circuits as circuit 203 inject a phase reversal at the location in the RF envelope of Loran C pulses corresponding to the PTR of such pulses. Processing apparatus 200 includes a switching circuit 204 for switching between inputs 204A and 204B and for providing the signals respectively appearing thereat to an output 204C when so instructed by a multiplex control signal provided to input 204D. More specifically, the control signal shown in FIG. 6A is fed to input 204D. When the control signal at input 204D is a logical one, switching circuit 204 switches the Loran C signal at input 204A to output 204C. This is readily seen by comparing the Loran C master pulse group fed to input 201 shown in FIG. 6B with the output signal generated at output 204C shown in FIG. 6C. When the control signal provided to input 204D is a logical zero, the envelope derived Loran C signal fed to switching circuit input 204B is switched to switching circuit output 204C. This is readily seen by comparing the envelope derived Loran C signal at input 204B and shown in FIG. 6D with the output signal from switching circuit 204 generated at output 204C and shown in FIG. 6C.

Switching circuit output 204C is coupled to the first of a plurality of hard limiting amplifiers connected in series, for example, amplifiers 210, 220, and 230 as shown in FIG. 5. Hard limiting amplifiers 210 through 230 hard limit the Loran C pulses and Loran C envelope derived pulses selectively provided thereto by switching circuit 204. The output of the last of the amplifiers 210 through 230, that is the output of amplifier 230 is coupled to an input 240A of a sampling circuit 240. Sampling circuit 240 samples the hard limited Loran C pulses and the hard limited envelope derived Loran C pulses fed to input 240A at times determined by sampling strobes provided to sampling circuit input 240B. A timing and control circuit 50, already described in the description of the prior art, is coupled to sampling circuit input 240B to provide sampling strobes thereto and to thus cause incoming Loran C pulses to be sampled at appropriate times as discussed in more detail subsequently. Such samples are fed to an input 250A of a switching circuit 250 having outputs 250B and 250C. Switching circuit 250 selectively switches the signals appearing at input 250A to outputs 250B or 250C in accordance with a multiplex control signal applied to an input 250D. It is noted that the same multiplex control signal applied to switching circuit input 240D is applied to switching input 250D such that switching circuits 204 and 250 respectively synchronously switch to input 204A and output 250B at the same time and to input 204B and ouput 250C at the same time. More specifically, when the multiplex control signal shown in FIG. 6A and applied to input 250D exhibits a logical one, switching circuit 250 feeds samples appearing at input 250A to output 250B. However, when the multiplex control signal exhibits a logical zero, samples appearing at input 250A are fed to output 250C.

Processing apparatus 200 includes a timing and control circuit 50 such as that already discussed in the description of the prior art above. Control circuit 50 includes storage or memory for the Loran C pulse samples taken by sampling circuit 240. This memory is accessed by providing such samples to the input of control circuit 50 designated RF SAMPLE STORE. Switching circuit output 250B is coupled to the RF SAMPLE STORE input of control circuit 50 such that the Loran C pulse samples taken by sampling circuit 240 are stored and appropriate memory in control circuit 50 and are available for further manipulation. Control circuit 50 includes memory for storing the envelope derived Loran C pulse samples taken by sampling circuit 240. Such memory is accessed by providing the envelope derived samples to an input of control circuit 50 designated ENV DER SAMPLE STORE. Switching output 250C is coupled to the ENV DER SAMPLE STORE input of control circuit 50 such that the envelope derived Loran C pulse samples taken by sampling circuit 240 are stored in appropriate memory in control circuit 50 and are avilable for subsequent manipulation. As discussed, control circuit 50 generates a sampling strobe called the Z strobe at a selected zero crossing of the Loran C pulses. The Z sampling strobes are generated at the Z STROBE output of control circuit 50 which is coupled to one input of a two input OR gate 260. Control circuit 50 generates a plurality of envelope strobes, for example, a strobe just prior to and a strobe just after the Z strobe such that the occurrence of a phase reversal of the selected zero crossing of the Loran C pulses may be detected. It is appreciated that this serves to identify the PTR zero crossing as already discussed. The time relationship between the Z strobe and corresponding envelope strobes is shown in FIG. 6F. The Z strobe is designated Z while the envelope strobe immediately prior to the Z strobe is designated ES1 and the envelope strobe immediately after the Z strobe is designated ES2. To obtain the above mentioned phase reversal information it has been found that suitable results are achieved when the ES1 strobe precedes the Z strobe by 7.5 microseconds and the ES2 strobe follows the Z strobe by 2.5 microseconds. The envelope strobes are generated at a control circuit 50 output designated ENVELOPE STROBE which is coupled to the remaining input of OR gate 260. The output of OR gate 260 is coupled to input 240B of sampling circuit 240 such that sampling circuit 240 is instructed to sample hard limited Loran C pulses and hard limited envelope derived Loran C pulses at appropriate times. OR gate 260 conveniently serves to combine the Z strobe and the envelope strobes into a single composite signal for controlling sampling circuit 240. The composite Z strobe and envelope strobe signal is shown in FIG. 6E.

As seen in FIG. 6E the composite strobe signal repeats every millisecond.

Although in the embodiment shown, the switching circuits 204 and 250 respectively switch to input 204A and output 250B for the first pulse of a Loran C pulse group and then respectively switch to input 204B and output 250C for the remaining seven significant pulses of a pulse group, it will be appreciated by those skilled in the art that switching circuits 204 and 250 may respectively switch to input 204A and output 250B for more than just one pulse of a pulse group. Likewise, switching circuits 204 and 250 may respectively switch to input 204B and output 250C for a number of Loran C pulses less than seven per pulse group.

The foregoing describes a time multiplexed Loran C signal processing apparatus which eliminates the need for precisely matched sets of hard limiting amplifiers in the Loran C RF and envelope derived Loran C RF channels of conventional Loran C signal processing apparatus. A less expensive Loran C signal processing apparatus is thus made possible.

While only certain preferred features of the invention have been shown by way of illustration, many modifications and changes will occur to those skilled in the art. It is, therefore, to be understood that the present claims are intended to cover all such modifications and changes as fall within the true spirit of the invention.

We claim:

1. An apparatus for processing radio location signals including a master station pulse group having a plurality of Loran pulses followed in time by a first secondary station pulse group having a plurality of Loran pulses followed in time by a second secondary station pulse group having a plurality of Loran pulses, said apparatus comprising:

input means to which said Loran pulses are provided;
   envelope deriver means for generating an envelope derived Loran pulse corresponding to each Loran pulse, thus generating envelope derived Loran pulse groups;
   first switching means, operatively coupled to said input means and said envelope deriver means, for selectively switching between the pulses of said Loran pulse groups and the pulses of corresponding envelope derived pulse groups and for providing the pulses so switched to a first output;
   sampling means, operatively coupled to said first output, for generating Loran pulse samples and envelope derived Loran pulse samples according to the type of pulse provided to said sampling means by said first switching means;
   second switching means, coupled to said sampling means, for selectively switching said Loran samples to a second output and for switching said envelope derived Loran pulse samples to a third output, and
   multiplexed control signal generating means, operatively coupled to said first and second switching means, for generating a multiplex control signal which instructs said first and second switching means to switch to said input means and said second output, respectively, during a first period of time per pulse group and to switch to said envelope deriver means and said second output, respectively, for a second period of time per pulse group, said second period of time being substantially greater than said first period of time.

2. The apparatus of claim 1 wherein the first period of time is approximately as long as one (1) Loran pulse.

3. The apparatus of claim 2 wherein the second period of time is approximately as long as seven (7) envelope derived Loran pulses.

4. An apparatus for processing radio location signals including a master station pulse group having a plurality of Loran pulses followed in time by a first secondary station pulse group having a plurality of Loran pulses followed in time by a second secondary station pulse group having a plurality of Loran pulses, said apparatus comprising:

input means to which said Loran pulses are provided;

envelope deriver means for generating an envelope derived Loran pulse corresponding to each Loran pulse, thus generating envelope derived Loran pulse groups;

first switching means, operatively coupled to said input means and said envelope deriver means, for selectively switching between the pulses of said Loran pulse groups and the pulses of corresponding envelope derived pulse groups and for providing the pulses so switched to a first output;

sampling means, operatively coupled to said first output, for generating Loran pulses samples and envelope derived Loran pulse samples according to the type of pulse provided to said sampling means by said first switching means;

second switching means, coupled to said sampling means, for selectively switching said Loran samples to a second output and for switching said envelope derived Loran pulse samples to a third output, and multiplexed control signal means, operatively coupled to said first and second switching means, for generating a multiplex control signal which instructs said first and second switching means to switch to said input means and said second output, respectively, during a first predetermined number of Loran pulses per pulse group and for instructing said first and second switching means to switch to said envelope deriver means and said third output, respectively, during a second predetermined number of envelope derived Loran pulses per pulse group, said second predetermined number being substantially larger than said first predetermined number.

5. The apparatus of claim 4 wherein said first predetermined number equals one.

6. The apparatus of claim 5 wherein said second predetermined number equals seven.

* * * * *